Dec. 13, 1966 H. T. MORTIMER 3,292,074

FREQUENCY DIVIDER UTILIZING A SATURABLE REACTOR AND A CAPACITOR

Filed April 3, 1963 2 Sheets-Sheet 1

INVENTOR.
HARRY T. MORTIMER
BY L. Lee Humphries
ATTORNEY

Dec. 13, 1966 H. T. MORTIMER 3,292,074

FREQUENCY DIVIDER UTILIZING A SATURABLE REACTOR AND A CAPACITOR

Filed April 3, 1963 2 Sheets-Sheet 2

INVENTOR.
HARRY T. MORTIMER

BY L. Lee Humphries

ATTORNEY

United States Patent Office 3,292,074

Patented Dec. 13, 1966

3,292,074

FREQUENCY DIVIDER UTILIZING A SATURABLE REACTOR AND A CAPACITOR

Harry T. Mortimer, Anaheim, Calif., assignor to North American Aviation, Inc.

Filed Apr. 3, 1963, Ser. No. 270,373
2 Claims. (Cl. 321—68)

This invention relates to a frequency divider circuit and more specifically to a frequency divider circuit using a saturable reactor.

Prior art frequency dividers such as vacuum tube and transistor frequency dividers, increase or decrease the frequency of an output signal by distorting the input signal to form strong harmonics. The desired harmonic frequency is selected with a properly tuned circuit. Reliability for extreme and varied environmental conditions is often difficult to achieve.

In the device of this invention, a capacitor is charged, then discharged through a saturable reactor which is driven to saturation by a alternating input voltage plus the capacitor voltage. During periods of unsaturation the voltage across the capacitor which is in series with the reactor remains relatively constant. The capacitor and saturable reactor are selected to form a quasi-resonant circuit which resonates at a frequency less than that of the input voltage. The circuit can also be used as a flip flop frequency divider by applying a single pulse of current across the capacitor to turn the output off. By proper frequency division the circuit can be made to act as a delay line.

Therefore it is an object of this invention to provide a frequency divider circuit comprised of a capacitor in series with a saturable reactor.

It is still a further object of this invention to provide a frequency divider circuit which can be used as a flip-flop frequency divider.

Still another object of this invention is to provide a frequency divider circuit which can work into a low impedance output circuit.

Another object of this invention is to provide a frequency divider circuit that is simple in operation and construction.

Another object of this invention is to provide a circuit which will work over a wide range of fundamental frequencies.

Still a further object of this invention is to provide a circuit which can be used as a single delay line.

These and other objects of the invention will become apparent from the following description taken in connection with the accompanying drawings, in which FIG. 1 illustrates one embodiment of the frequency divider;

Figure 1:
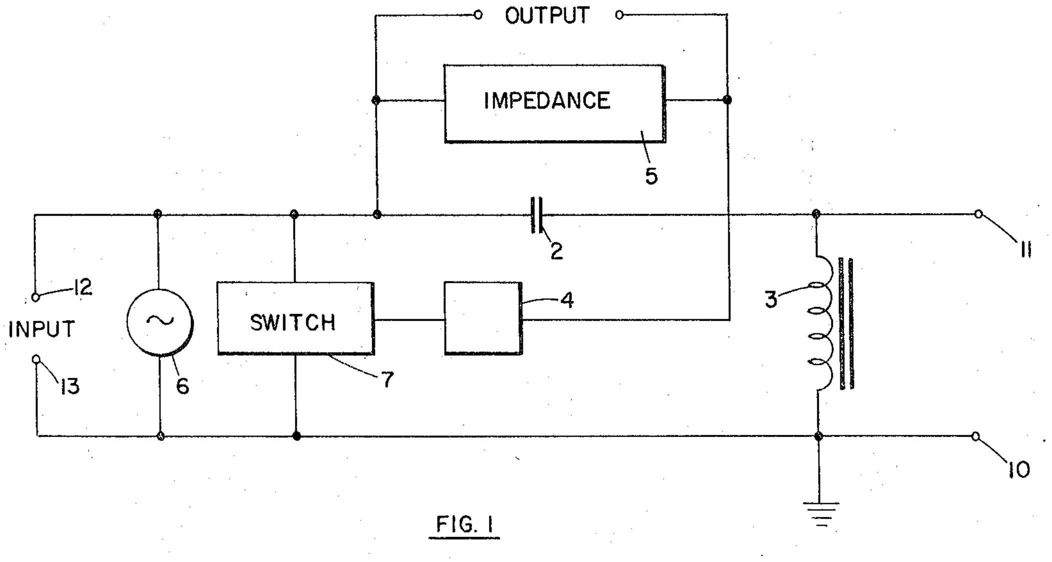

Referring now to FIG. 1, capacitor 2 is connected in series with saturable reactor 3. Voltage generating means 4 such as a battery, diode, flip flop, multivibrator, etc., with switch means 7 such as a single pole double throw with neutral, transistor switch, diode gates, etc., is connected between capacitor 2 and saturable reactor 3 to terminal 10. Impedance 5 is connected in parallel with capacitor 2. Voltage means 4 may also be connected in parallel with capacitor 2 by switching means 7. Source 6 for supplying an alternating input voltage is connected across terminals 12 and 13.

The operation of this circuit is divided into two parts, capacitor 2 is first charged by a pulse of energy received from voltage means 4 by proper setting switch means 7. After capacitor 2 is charged the alternating input voltage from source 6 begins to saturate reactor 3 at a rate which is some subharmonic of the supply voltage frequency. While reactor 3 is being saturated, the voltage of capacitor 2 remains relatively constant. The capacitor current during the period of saturating the reactor 3 is limited to the magnetizing current of the core and the capacitor is sufficiently large so that its voltage does not change appreciably until the reactor saturates. When the reactor 3 saturates its saturation inductance and capacitor 2 form a quasi-resonant series circuit (in which the reactor 3 has substantially no impedance) causing capacitance voltage reversal with a reasonably high Q, for example from three to thirty. This tank circuit would normally resonate at a frequency considerably higher than the frequency of the input voltage, but while the reactor is in saturation, it is driven back into unsaturation by the flux progressing away from saturation at a rate set by the reversed polarity voltage on the capacitor. The cycle is the repeated with polarities and flux direction reversed.

If resonance is prevented by momentarily short circuiting capacitor 2 while the reactor is saturated, the circuit may, by this means, become a controlled flip flop. Under the above conditions, no stored energy would remain in the capacitor to add to the alternating input voltage for saturating the reactor.

The circuit may be used as a delay line. For example if a pulse having a frequency of 1000 cycles per second is put in, but a delay equivalent to reducing the frequency rate to 500 cycles is required, by proper selection of the capacitor, reactor, etc., values, the delay can be achieved.

Figure 2:
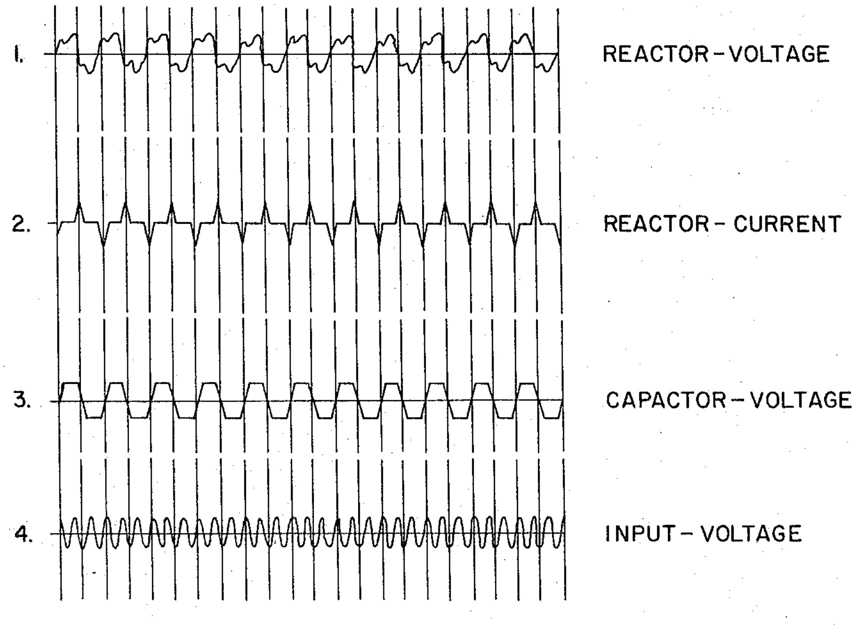
FIG. 2 illustrates wave shapes taken at various points of the circuit.

FIG. 2 illustrates voltage and current wave shapes taken at selected points in the circuit when the circuit is in operation. Wave shape 1 is a representation of reactor voltage taken across points 10 and 11. Peak voltage occurs prior to saturation at which time the polarity of the wave changes. Wave 2 is an illustration of the current through the reactor. At saturation the current peaks at a maximum value. The output voltage or the voltage across capacitor 2 is shown in the form of a square wave. Before saturation the voltage across the capacitor remains constant, at saturation the voltage discharges through the reactor until the reactor becomes unsaturated at which time the capacitor is charged oppositely than it was before saturation and is maintained at a constant level until saturation of the reactor in the opposite direction. Wave 4 is an illustration of the input voltage applied at the input between points 12 and 13. One embodiment of an operable frequency divider would be a circuit wherein the frequency of the input voltage is 2400 cycles per second, impedance 5 is approximately 3000 ohms, capacitor 2 is approximately 0.8 microfarad, voltage supplied by the voltage means is approximately 10 volts, current supplied by the source 6 is approximately 0.1 amperes rect. ave. with a voltage of 10 volts rms. Reactor 3 might be a core wound with 500 turns (commercially available as an Arnold Eng. Co. 4179S1, however, since magnetic materials change, it is likely that adjustments in number of turns might have to be made before an exact desired frequency output or a function of frequency input can be achieved) and have a winding resistance of approximately 7½ ohms. The output frequency for the particular circuit configuration would be 800 cycles per second with an output voltage of 40 volts rms.

Figure 3:
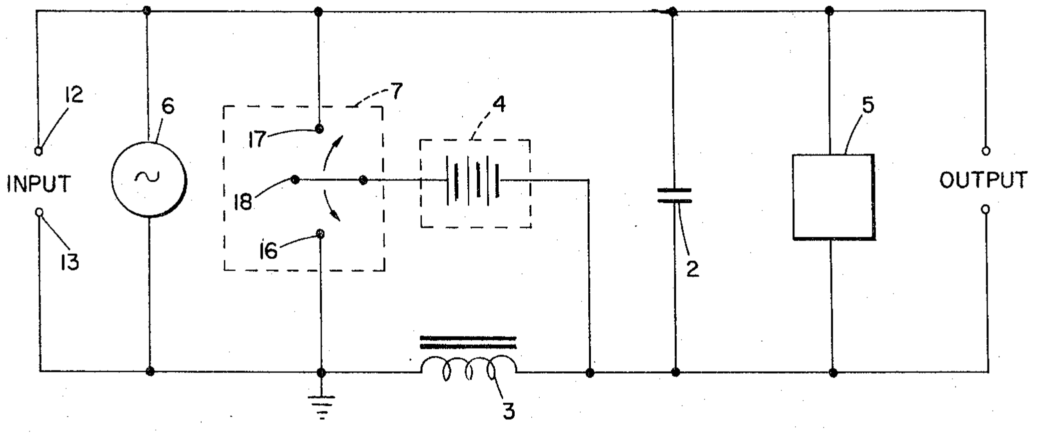
FIG. 3 illustrates another embodiment of the frequency divider.

One embodiment for the voltage and switch means is shown in FIG. 3 wherein voltage means 4 is shown as a battery 14 connected for being placed in parallel with reactor 3 or capacitor 2 whenever switch means 7 is depressed to one of the positions shown. In order to initiate circuit operation, switch means 7 is depressed just long enough for capacitor 2 to charge up and then it is released. The circuit will oscillate until turned off. Switch means 7 may be a transistor switch circuit so that operation of the switch is controlled by outside sources such as a flip flop or logic gate.

Figure 4:
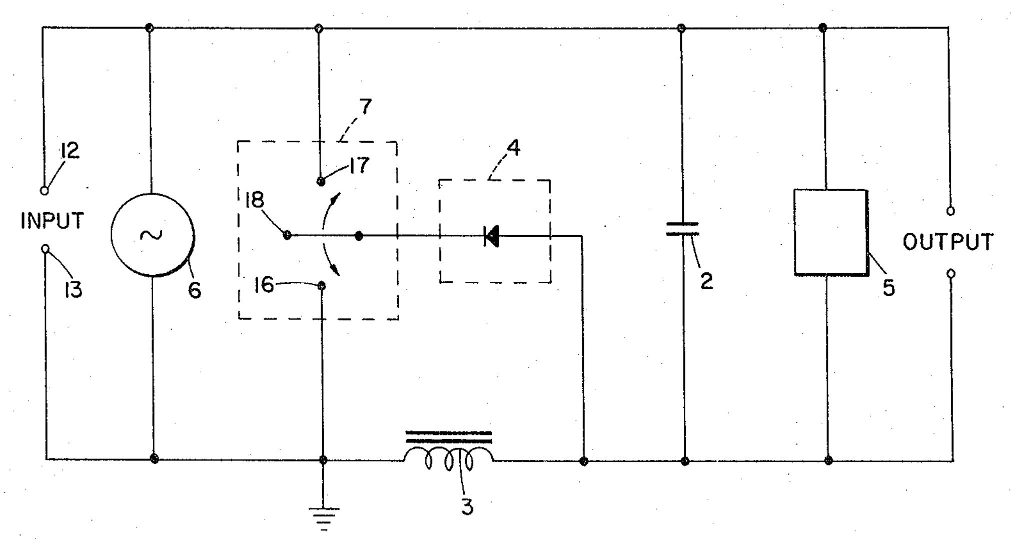
FIG. 4 illustrates still another embodiment of the frequency divider.

Another embodiment of the voltage and switch means is shown in FIG. 4 wherein voltage means 4 is a single diode 15. When switch means 7 is depressed to position 16 the input voltage is rectified and used to charge capacitor 2. Whenever switch means 7 is depressed to position 17 the capacitor will not charge after reactor saturation and the circuit will discontinue oscillating.

The following conclusions were reached in connection with tests conducted on the embodiment shown in FIG. 4. It was concluded that a subharmonic of the input frequency could be obtained depending on selection of circuit components.

$$F_2=\frac{F_1}{N}$$

Where $F_2$ is the frequency of the output signal taken across impedance means 5, $F_1$ is the frequency of the input signal from alternating source means 6 and N is an integral number by which $F_1$ is divided. The saturation of the reactor is controlled by the cumulative addition of the value of the capacitor voltage to the value of the alternating voltage from source means 6. The reactor and the capacitor are selected to form a quasi-resonant circuit. Reactor 3 is driven alternately into saturation in one direction and then into saturation in another direction at a rate which is a subharmonic of the frequency of the voltage signal generated by source means 6. The particular rate being controlled by the value of capacitor means 2, number of turns on reactor means 3, frequency and value of the signal from input means 6, etc. The combination of source means 6 driving the reactor into saturation in conjunction with the capacitor voltage, alternately produces an increasing flux in one direction which causes reactor saturation and then when the capacitor has discharged through the saturated reactor and through the low impedance source means to a voltage which is opposite to that which it had before the reactor was driven into saturation, an increasing flux in the opposite direction is produced and the cycle is repeated. Saturation of the core of reactor 3 may be represented by the following equation.

$$\phi \text{ at saturation of reactor}=\int_0^t e\,dt=\int_0^t (e_{AC}+e_C)\,dt$$

where $$\int_0^t e_{AC}\,dt<\phi \text{ at saturation}$$

Where $e_{AC}$ represents the input voltage and $e_C$ represents the capacitor voltage after the capacitor has been charged to a voltage value by momentarily connecting the switch means to position 16 so that capacitor 2 is charged with the rectified value of the voltage signal from source means 6 and $t$ represents time of saturation. After the capacitor has charged up by the momentary contact of the switch in position 16, diode 19 is disconnected from the circuit and the capacitor and the switch remain in position 18. If it is desired to cut the circuit off the switch is momentarily placed in position 17 so that the capacitor is discharged. If the output frequency was required to be one third of the input, the equation would be represented as follows:

$$\int_0^t e_{AC}\,dt+3\int_0^t e_C\,dt=\phi \text{ at saturation}$$

or if the division was to be one fifth, $\phi$ at saturation would equal:

$$\int_0^t e_{AC}\,dt+5\int_0^t e_C\,dt=\phi \text{ at saturation}$$

When using the embodiment shown in FIG. 4 with reactor 3 having 160 turns (commercially available as 50084–2A from Magnetics, Inc., cores may be stacked together in order to achieve a particular subharmonic) the relationships represented by the preceding equations were found to exist.

Although the invention has been illustrated and described in detail, it is to be clearly understood that the same is by way of illustration and example only and is not to be taken by way of limitation, the spirit and scope of this invention being limited only by the terms of the appended claims.

I claim:

1. In combination:

capacitor means, direct current source means for charging said capacitor means to a voltage level, switch means comprising means for connecting the current source means to said capacitor for charging the capacitor to said level, saturable reactor means connected in series with said capacitor means and having an inductance for forming a quasi-resonant circuit with said capacitor means when said reactor is saturated, alternating voltage source means connected in series with said capacitor and said saturation reactor means for driving said saturable reactor means into saturation when said capacitor means is charged to said voltage level, said capacitor means including means for driving said reactor means out of saturation by discharging said capacitor means through said reactor means after the reactor means is saturated.

2. In combination:

alternating voltage source means, capacitor means in series with said source means, saturable reactor means in series with said capacitor means and said alternating voltage source means, impedance means in parallel with said capacitor means and in series with said alternating voltage source means and said saturable reactor means, charging means, means including a first switch means for momentarily connecting said charging means in parallel with said capacitor means for charging said capacitor means to a voltage, including means for disconnecting said charging means from said capacitor means after the capacitor is charged to said voltage, and wherein is further included a second switch means for discharging said capacitor means, said first and second switch means comprise a single pole, double throw switch having a neutral, unconnected position.

References Cited by the Examiner

UNITED STATES PATENTS

| | | | |
|---|---|---|---|
| 2,787,755 | 4/1957 | Smith | 321—68 |
| 2,869,004 | 1/1959 | Melville | 307—88 X |
| 3,211,915 | 10/1965 | Poehlman | 317—88 |

JOHN F. COUCH, *Primary Examiner.*

G. GOLDBERG, *Assistant Examiner.*